United States Patent
Lee et al.

(10) Patent No.: US 10,968,555 B2
(45) Date of Patent: Apr. 6, 2021

(54) METHOD FOR INSPECTING UNBALANCE ERROR OF WASHING MACHINE AND WASHING MACHINE

(71) Applicant: LG Electronics Inc., Seoul (KR)

(72) Inventors: Sanghyun Lee, Seoul (KR); Bonkwon Koo, Seoul (KR); Hyunji Park, Seoul (KR); Seungchul Cha, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/575,103

(22) Filed: Sep. 18, 2019

(65) Prior Publication Data
US 2020/0010999 A1 Jan. 9, 2020

(30) Foreign Application Priority Data
Aug. 20, 2019 (KR) .................. 10-2019-0101988

(51) Int. Cl.
*G06N 20/00* (2019.01)
*D06F 34/18* (2020.01)

(52) U.S. Cl.
CPC ............. *D06F 34/18* (2020.02); *G06N 20/00* (2019.01)

(58) Field of Classification Search
None
See application file for complete search history.

(56) References Cited

U.S. PATENT DOCUMENTS

| 6,418,581 B1 * | 7/2002 | Bruce ................... D06F 37/203 68/12.02 |
| 2004/0211009 A1 * | 10/2004 | Murray ................. D06F 35/007 8/159 |
| 2014/0115792 A1 * | 5/2014 | Lee ....................... D06F 37/203 8/137 |
| 2017/0145615 A1 * | 5/2017 | Janke ................... D06F 37/203 |

* cited by examiner

*Primary Examiner* — Eric W Golightly
(74) *Attorney, Agent, or Firm* — Birch, Stewart, Kolasch & Birch, LLP

(57) ABSTRACT

A method for detecting an unbalance error of a machine-learning-based washing machine and the washing machine are provided. The method identifies whether laundry is within an inner drum of the washing machine using a laundry movement identifying model provided in an AI device of a server or the washing machine, measures an unbalance value on the basis of data of unbalance when the laundry is not moving, and then detects an unbalance error. The unbalance error can be more precisely detected without using additional components. The AI device for detecting the unbalance error of the present disclosure can be associated with drones (unmanned aerial vehicles (UAVs)), robots, augmented reality (AR) devices, virtual reality (VR) devices, devices related to 5G service, and the like.

10 Claims, 13 Drawing Sheets

- DL/UL ACK/NACK
- UE CQI/PMI RI REPORT USING PUSCH AND PUCCH input layer     hidden layer 1     hidden layer 2     output layer

METHOD FOR INSPECTING UNBALANCE ERROR OF WASHING MACHINE AND WASHING MACHINE

CROSS-REFERENCE TO RELATED APPLICATIONS

This non-provisional application claims the benefit under 35 U.S.C. § 119(a) to Patent Application No. 10-2019-0101988, filed in the Republic of Korea on Aug. 20, 2019, all of which are hereby expressly incorporated by reference into the present application.

BACKGROUND

Field of the Disclosure

The present disclosure relates to a method for detecting an unbalance error of a machine-learning-based washing machine and a washing machine and, more particularly, to a machine-learning-based smart washing machine, capable of predicting an unbalance error at a spin-drying step.

Related Art

Generally, a washing machine means various devices for treating laundry by applying physical action and/or chemical action to laundry such as clothes or bedding. The washing machine includes an outer drum that contains wash water therein, and an inner drum that contains laundry and is rotatably installed in the outer drum. A washing method of the general washing machine includes a washing process of washing laundry by rotating the inner drum, and a spin-drying process of spin-drying the laundry using the centrifugal force of the inner drum.

If the washing machine senses only the weight of the laundry, the condition of the laundry cannot be known, so that an operation is performed depending on the weight. Before entering the spin-drying operation, a laundry untangling operation is performed to lower an unbalance value. If this falls below a certain value, the spin-drying operation is started. In the case of the laundry such as a blanket that fills up the washing machine, the unbalance problem is not solved even if the laundry untangling operation is performed.

SUMMARY OF THE DISCLOSURE

The present disclosure is to solve the necessities and/or problems described above.

The present disclosure provides a method for detecting an unbalance error of a machine-learning-based washing machine and a washing machine.

The present disclosure also provides a machine-learning-based washing machine, which identifies whether laundry is moved or not and causes a customer to recognize the occurrence of an unbalance error (UBE) through a terminal, if the occurrence of the unbalance error is predicted.

Furthermore, the present disclosure provides a machine-learning-based washing machine, which can identify whether laundry is moved or not and can reduce an operating time by changing a spin-drying profile, if the occurrence of the unbalance error is predicted.

In an aspect, a method for detecting an unbalance error of a machine-learning-based washing machine includes acquiring data on a driving current and revolutions per minute (RPM) of a motor provided in the washing machine while the washing machine is being operated; extracting input data from the acquired data; inputting the extracted input data into a laundry movement identifying model, and determining whether laundry inserted into an inner drum is moved or not, based on an output value of the laundry movement identifying model; and detecting the unbalance error based on the data on the driving current and the RPM, when it is determined that the laundry is not moved.

An operating section of the washing machine may include at least one of a washing section, a rinsing section or a spin-drying section, and the acquiring of the data on the driving current and the RPM may be performed in a section where the laundry comes into close contact with the inner drum among the washing section or the spin-drying section maintaining a preset speed.

The extracting of the input data may analyze a profile of the acquired data, and may sample the input data from a stabilization section having a predetermined periodicity in the profile.

The detecting of the unbalance error may include measuring an unbalance value based on the data on the driving current and the RPM; and determining that the unbalance error occurs, when the unbalance value exceeds a preset threshold value.

The method may further include changing a running course into a special course when the unbalance value is less than the preset threshold value, wherein the special course may not perform a laundry dispersion process, and may not short-circuit the motor even if the unbalance error occurs.

The method may further include transmitting a message about the unbalance error to a user terminal when the unbalance error occurs.

The method may further include receiving a response to the message about the unbalance error from the user terminal, and controlling an operation of the washing machine depending on the response.

The controlling of the operation of the washing machine may control the washing machine to terminate the operation or to change the operation of the washing machine into the special course, and the special course may be a course where the laundry dispersion process is not performed and the motor is not short-circuited even if the unbalance error occurs.

The message about the unbalance error may include at least one of an image photographing a condition of the laundry, information about occurrence of the unbalance error or information about time when the unbalance error occurs.

The method may further include delivering a guide message through a speaker of the washing machine, when the unbalance error occurs.

In another aspect, a machine-learning-based washing machine includes an inner drum containing laundry therein and a processor, and the processor acquires data on a driving current and RPM of a motor provided in the washing machine while the washing machine is being operated, applies the acquired data to a previously learned laundry movement identifying model to determine whether laundry inserted into the inner drum is moved or not, based on an output value of the laundry movement identifying model, and detects the unbalance error based on the data on the driving current and the RPM, when it is determined that the laundry is not moved.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the technical features of the disclosure. In the drawings.

Figure 1:
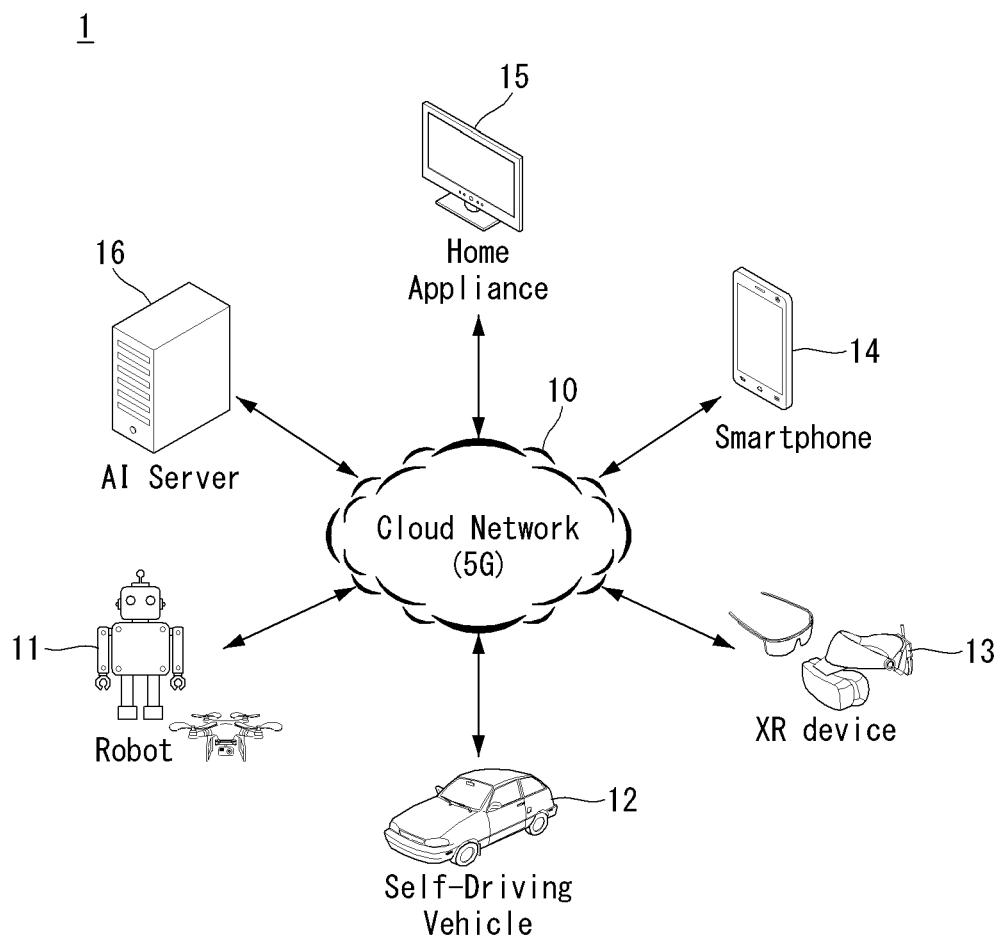
FIG. 1 illustrates one embodiment of an AI system.

The accompanying drawings, which are included to provide a further understanding of the disclosure and are incorporated in and constitute a part of this specification, illustrate embodiments of the disclosure and together with the description serve to explain the technical features of the disclosure.

DESCRIPTION OF EXEMPLARY EMBODIMENTS

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present disclosure; rather, it should be understood that the appended drawings include all of the modifications, equivalents or substitutes described by the technical principles and belonging to the technical scope of the present disclosure.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 illustrates one embodiment of an artificial intelligence (AI) system.

Referring to FIG. 1, in the AI system 1, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR).

The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

Hereinafter, 5G communication (5th generation mobile communication) required by an apparatus requiring AI processed information and/or an AI processor will be described through paragraphs A through G.

A. Example of Block Diagram of UE and 5G Network

Figure 2:
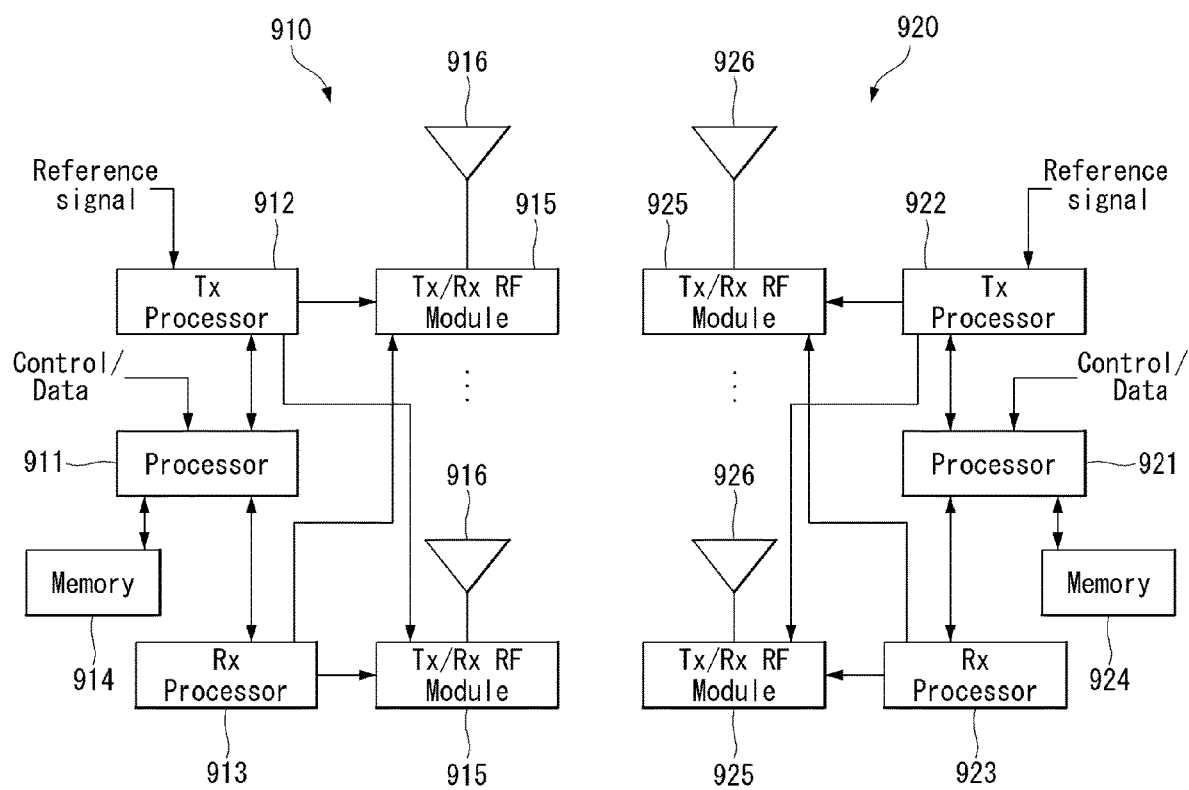
FIG. 2 illustrates a block diagram of a wireless communication system to which the methods proposed herein may be applied.

FIG. 2 is a block diagram of a wireless communication system to which methods proposed in the disclosure are applicable.

Referring to FIG. 2, a device (autonomous device) including an autonomous module is defined as a first communication device (910 of FIG. 2), and a processor 911 can perform detailed autonomous operations.

A 5G network including another vehicle communicating with the autonomous device is defined as a second communication device (920 of FIG. 2), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 2, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 3:
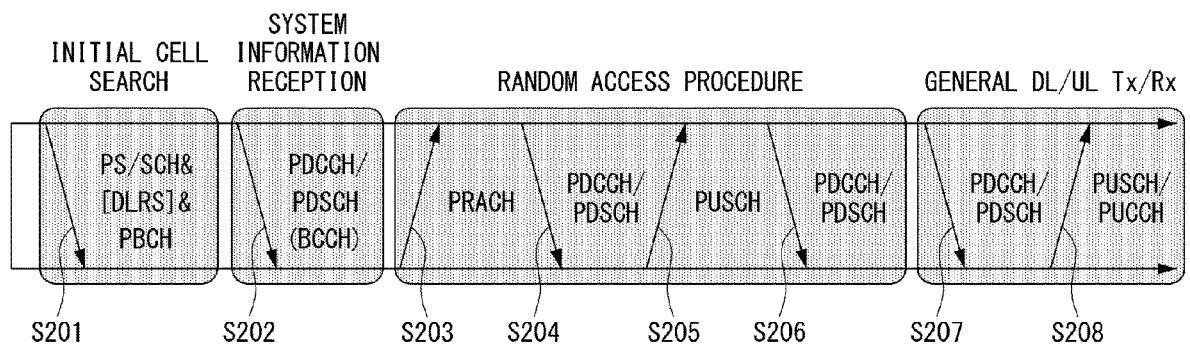
FIG. 3 illustrates an example of a signal transmission/reception method in a wireless communication system.

FIG. 3 is a diagram showing an example of a signal transmission/reception method in a wireless communication system.

Referring to FIG. 3, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 3.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 3.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) returning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Using 5G Communication

Figure 4:
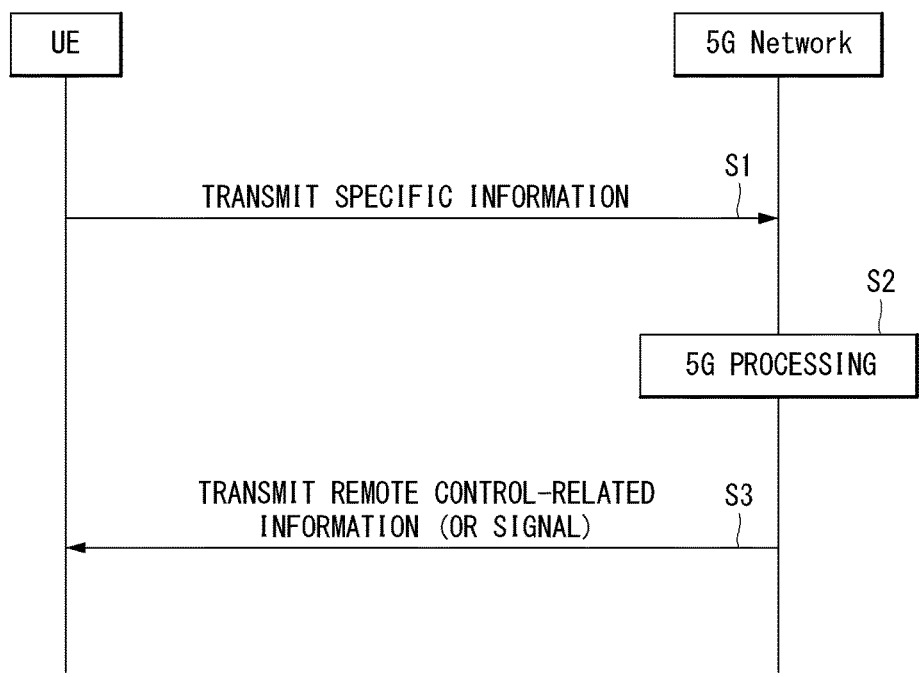
FIG. 4 illustrates an example of basic operations of a user terminal and a 5G network in a 5G communication system.

FIG. 4 shows an example of basic operations of a UE and a 5G network in a 5G communication system.

The UE transmits specific information to the 5G network (S1). In addition, the 5G network can determine whether to remotely control the vehicle (S2). Here, the 5G network may include a server or a module which performs remote control related to autonomous driving. In addition, the 5G network can transmit information (or signal) related to remote control to the UE (S3).

G. Applied Operations Between UE and 5G Network in 5G Communication System

Hereinafter, the operation of using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 4, the UE performs an initial access procedure and a random access procedure with the 5G network prior to step S1 of FIG. 4 in order to transmit/receive signals, information and the like to/from the 5G network.

More specifically, the UE performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the UE receives a signal from the 5G network.

In addition, the UE performs a random access procedure with the 5G network for UL synchronization acquisition and/or UL transmission. The 5G network can transmit, to the UE, a UL grant for scheduling transmission of specific information. Accordingly, the UE transmits the specific information to the 5G network on the basis of the UL grant. In addition, the 5G network transmits, to the UE, a DL grant for scheduling transmission of 5G processing results with respect to the specific information. Accordingly, the 5G network can transmit, to the UE, information (or a signal) related to remote control on the basis of the DL grant.

Next, a basic procedure of an applied operation to which a method proposed by the present disclosure which will be described later and URLLC of 5G communication are applied will be described.

As described above, an UE can receive DownlinkPreemption IE from the 5G network after the UE performs an initial access procedure and/or a random access procedure with the 5G network. Then, the UE receives DCI format 2_1 including a preemption indication from the 5G network on the basis of DownlinkPreemption IE. The UE does not perform (or expect or assume) reception of eMBB data in resources (PRBs and/or OFDM symbols) indicated by the preemption indication. Thereafter, when the UE needs to transmit specific information, the UE can receive a UL grant from the 5G network.

Next, a basic procedure of an applied operation to which a method proposed by the present disclosure which will be described later and mMTC of 5G communication are applied will be described.

Description will focus on parts in the steps of FIG. 4 which are changed according to application of mMTC.

In step S1 of FIG. 4, the UE receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the UE transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 5:
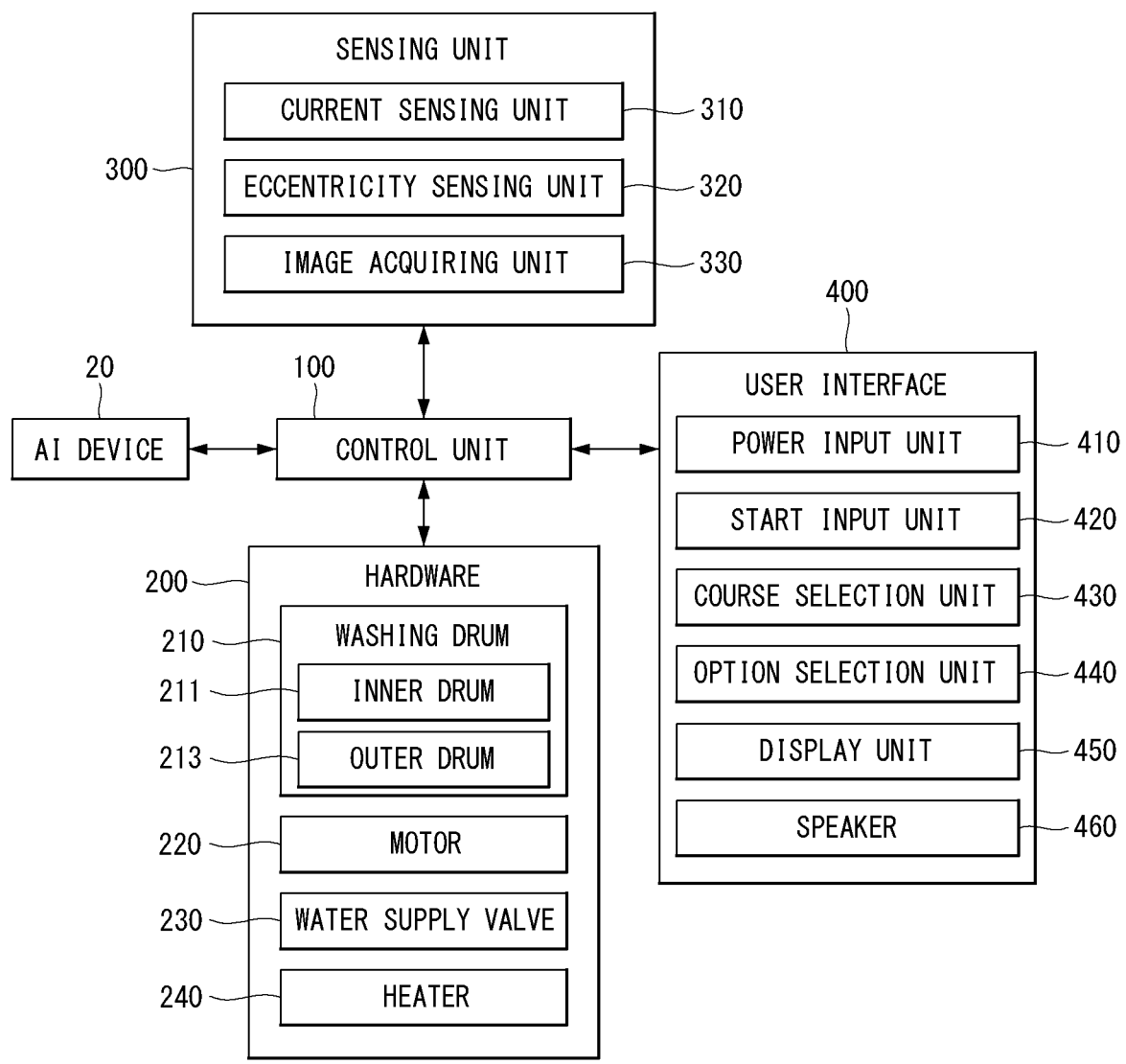
FIG. 5 is a block diagram of a washing machine according to an embodiment of the present disclosure.

FIG. 5 is a block diagram of a washing machine according to an embodiment of the present disclosure.

Referring to FIG. 5, the washing machine WM according to the embodiment of the present disclosure includes a control unit 100, a hardware unit 200, an AI device 20, a communication module (not shown) and a user interface 400.

The control unit 100 controls the whole driving of the washing machine WM, by controlling the hardware 200 according to information inputted through the user interface 400. Furthermore, the control unit 100 controls the operation of the hardware 200 based on a laundry image acquired through an image acquiring unit 330. To be more specific, the control unit 100 may acquire laundry classification information or laundry dispersion information based on the laundry image, and may control the operation of the hardware 200 based on the laundry classification information or the laundry dispersion information. The laundry classification information may be information about the kind, material, and others of the laundry, and may particularly refer to the moisture content information of the laundry. The laundry dispersion information may refer to information about the placement or height of the laundry seated in an inner drum 211.

The control unit 100 may learn the laundry classification information to predict the vibration degree of the inner drum 211 which may occur in a spin-drying process, and may vary the revolutions per minute (RPM) of a motor 220 in the spin-drying process according to the vibration degree of the inner drum 211. For example, when the laundry classification information is determined as laundry that may cause a short circuit, the control unit 100 may control to lower the RPM of the motor 220 in the spin-drying process.

The hardware 200 may include a washing drum 210, the motor 220, a water supply valve 230, a heater 240, etc.

The washing drum 210 includes an outer drum 213 that contains wash water therein, and an inner drum 211 that is disposed inside the outer drum 213, contains the laundry therein, and is rotated using a rotating force supplied from the motor 220. The water supply valve 230 controls the supply of the wash water. The heater 240 heats water supplied into the washing drum.

The sensing unit 300 may include an image acquiring unit 330, an eccentricity sensing unit 320, and a current sensing unit 310.

The image acquiring unit 330 acquires the image of the laundry seated in the inner drum 211. The image acquiring unit 330 may use at least one of a 2D or 3D camera, and may be disposed on a cover of the washing machine WM.

The user interface 400 may include a power input unit 410, a start input unit 420, a course selection unit 430, an option selection unit 440, a display unit 450, and a speaker 460.

The power input unit 410 provides a means for controlling the on/off of a main power supply of the washing machine WM. The start input unit 420 provides a means for controlling the start of a washing process, a rinsing process or a spin-drying process. The course selection unit 430 provides a means that may select the kind of the washing process, the rinsing process or the spin-drying process. The option selection unit 440 provides a means that may select detailed options to proceed with the washing process, the rinsing process or the spin-drying process. For example, the option selection unit 440 may be the means for selecting water temperature, time, reservation, etc. The display unit 450 may display the operating condition of the washing machine WM, and may display course information selected by a user through the course selection unit 430 or option information selected through the option selection unit 440. The speaker 460 outputs a situation for the operating condition or a specific event of the washing machine WM as a voice signal. The specific event may be a situation where laundry dispersion or RPM is controlled based on the laundry image.

The current sensing unit 310 senses current flowing in the motor 220, namely, driving current Id. As the current sensing unit 310, various examples such as a hall sensor or an encoder are possible. The current sensing unit 310 periodically senses the current Id flowing in the motor 220, thus inputting the sensed current into the control unit. The control unit may sense the volume of laundry based on the current sensed by the current sensing unit 310.

The washing machine WM may further include the eccentricity sensing unit 320 that senses the eccentricity of the laundry put into the inner drum 211, namely, the unbalance (UB) of the inner drum 211. The eccentricity sensing unit 320 may sense the unbalance, based on the rotation-speed variation of the inner drum 211, namely, the rotation-speed variation of the motor 220. To this end, a speed sensing unit (not shown) may be separately provided to sense the rotation speed of the motor 220, or a rotation speed may be calculated based on the driving current Id of the motor 220 sensed by the current sensing unit 310 and thereby the unbalance may be sensed based on the calculated rotation speed. The eccentricity sensing unit 320 may be provided in the control unit.

The communication module (not shown) may transmit information sensed in the washing process by the washing machine WM, the sensed error information and others to an external electronic device. For example, the external electronic device may include Bluetooth equipment, an autonomous vehicle, a robot, a drone, an AR device, a mobile device, a home appliance and the like.

Figure 6:
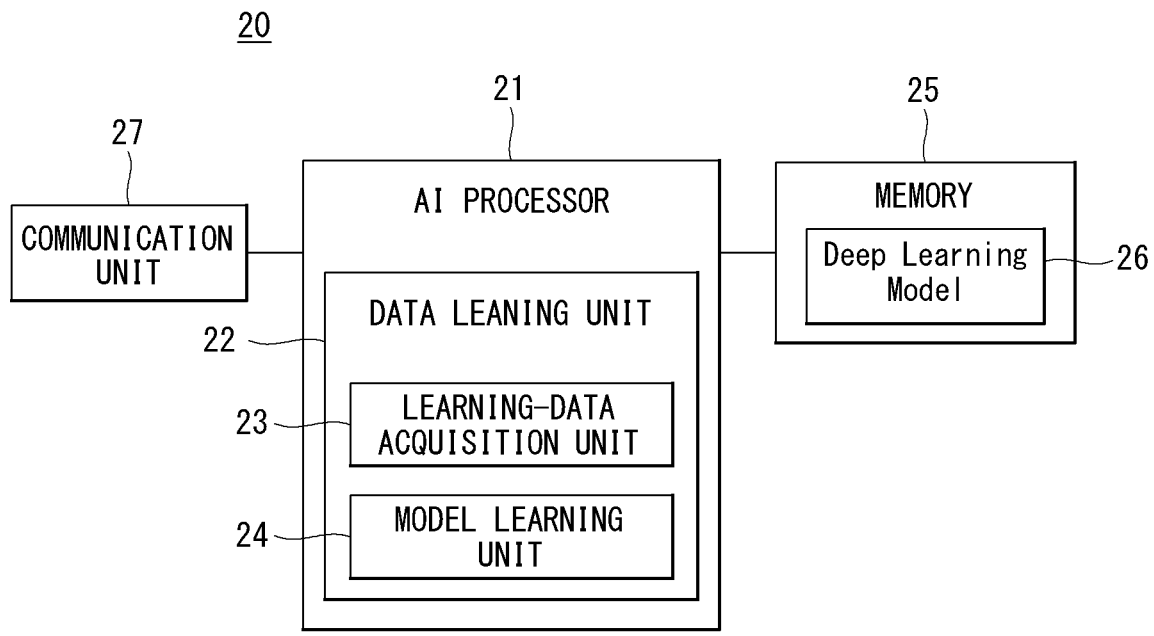
FIG. 6 is a block diagram of an AI device according to an embodiment of the present disclosure.

FIG. 6 is a block diagram of the AI device according to an embodiment of the present disclosure.

Referring to FIG. 6, the AI device 20 may include an electronic device having an AI module or a server having an AI module, which may perform AI processing. Furthermore, the AI device 20 may be incorporated in at least a part of the washing machine WM shown in FIG. 5 to perform at least a part of the AI processing together.

The AI processing may include all operations related to the control unit 100 of the washing machine WM shown in FIG. 5. For example, the washing machine WM may perform the AI processing for the laundry image or the laundry classification information or the laundry dispersion information to perform processing/determination, control signal generating operations.

The AI device 20 may be a client device that directly uses the AI processing result, or a device of cloud environment that provides the AI processing result to another device. The AI device 20 may be a computing device that may learn a neural network, and may be implemented as various electronic devices, such as a server, a desktop PC, a laptop PC, or a tablet PC.

The AI device 20 may include an AI processor 21, a memory 25 and/or a communication unit 27.

The AI processor 21 may learn a neural network using a program stored in the memory 25. Particularly, the AI processor 21 may learn a neural network to recognize the related data of the washing machine WM. Here, the neural network for recognizing the related data of the washing machine WM may be designed to simulate the structure of the human brain on a computer, and may include a plurality of network nodes having weights that simulate the neurons of the human neural network. The plurality of network nodes may exchange data according to the connecting relationship to simulate the synaptic action of neurons in which the neurons exchange signals through synapses. Here, the neural network may include a machine learning model developed from the neural network model. The machine learning model may be a deep learning model. While the plurality of network nodes is located at different layers in the deep learning model, the nodes may exchange data according to the convolution connecting relationship. Examples of the neural network model include various deep learning techniques, such as a deep neural network (DNN), a convolution neural network (CNN), a recurrent neural network (RNN, Recurrent Boltzmann Machine), a restricted Boltzmann machine (RBM), a deep belief network (DBN) or a deep Q-Network, and may be applied to fields such as computer vision, voice recognition, natural language processing, voice/signal processing or the like.

Meanwhile, the processor performing the above-described function may be a general-purpose processor (e.g. CPU), but may be an AI dedicated processor (e.g. GPU) for artificial intelligence learning.

The memory 25 may store various programs and data required to operate the AI device 20. The memory 25 may be implemented as a non-volatile memory, a volatile memory, a flash memory, a hard disk drive (HDD) or a solid state drive (SDD). The memory 25 may be accessed by the AI processor 21, and reading/writing/correcting/deleting/update of data by the AI processor 21 may be performed. Furthermore, the memory 25 may store the neural network model (e.g. the deep learning model 26) generated through a learning algorithm for classifying/recognizing data in accordance with the embodiment of the present disclosure.

The AI processor 21 may include a data learning unit 22 which learns the neural network for data classification/recognition. The data learning unit 22 may learn a criterion about what learning data is used to determine the data classification/recognition and about how to classify and recognize data using the learning data. The data learning unit 22 may learn the deep learning model by acquiring the learning data that is used for learning and applying the acquired learning data to the deep learning model.

The data learning unit 22 may be made in the form of at least one hardware chip and may be mounted on the AI device 20. For example, the data learning unit 22 may be made in the form of a dedicated hardware chip for the artificial intelligence AI, and may be made as a portion of the general-purpose processor (CPU) or the graphic dedicated processor (GPU) to be mounted on the AI device 20. Furthermore, the data learning unit 22 may be implemented as a software module. When the data learning unit is implemented as the software module (or a program module including instructions), the software module may be stored in a non-transitory computer readable medium. In this case, at least one software module may be provided by an operating system (OS) or an application.

The data learning unit 22 may include the learning-data acquisition unit 23 and the model learning unit 24.

The learning-data acquisition unit 23 may acquire the learning data needed for the neural network model for classifying and recognizing the data.

The model learning unit 24 may learn to have a determination criterion about how the neural network model classifies predetermined data, using the acquired learning data. The model learning unit 24 may learn the neural network model through supervised learning using at least some of the learning data as the determination criterion. Alternatively, the model learning unit 24 may learn the neural network model through unsupervised learning that finds the determination criterion, by learning by itself using the learning data without supervision. Furthermore, the model learning unit 24 may learn the neural network model through reinforcement learning using feedback on whether the result of situation determination according to the learning is correct. Furthermore, the model learning unit 24 may learn the neural network model using the learning algorithm including error back-propagation or gradient descent.

The supervised learning is performed using a series of learning data and a label (target output value) corresponding thereto. A neural network model based on the supervised learning may be a model that derives a function from training data. The supervised learning may receive a series of learning data and a target output value corresponding thereto, may find an error through learning that compares an actual output value for the input data with a target output value, and may modify a model on the basis of the corresponding result. The supervised learning may be divided into regression, classification, detection, and semantic segmentation depending on the type of the result. The function derived from the supervised learning may be used to predict a new result value again. As such, the neural network model based on the supervised learning may optimize the parameter of the neural network model by learning many learning data.

If the neural network model is learned, the model learning unit 24 may store the learned neural network model in the memory. The model learning unit 24 may store the learned neural network model in the memory of the server connected to the AI device 20 with a wired or wireless network.

The data learning unit 22 may further include a learning-data preprocessing unit (not shown) and a learning-data selection unit (not shown) to improve the analysis result of the recognition model or to save resources or time required for generating the recognition model.

The learning-data preprocessing unit may preprocess the acquired data so that the acquired data may be used for learning for situation determination. For example, the learning-data preprocessing unit may process the acquired data in a preset format so that the model learning unit 24 may use the acquired learning data for learning for image recognition.

Furthermore, the learning-data selection unit may select the data required for learning among the learning data acquired by the learning-data acquisition unit 23 or the learning data preprocessed in the preprocessing unit. The selected learning data may be provided to the model learning unit 24. For example, the learning-data selection unit may select only data on the object included in a specific region as the learning data, by detecting the specific region in the image acquired by the photographing means of the washing machine WM.

Furthermore, the data learning unit 22 may further include a model evaluation unit (not shown) to improve the analysis result of the neural network model.

When the evaluated data is input into the neural network model and the analysis result outputted from the evaluated data does not satisfy a predetermined criterion, the model evaluation unit may cause the model learning unit 22 to learn again. In this case, the evaluated data may be predefined data for evaluating the recognition model. By way of example, the model evaluation unit may evaluate that the predetermined criterion is not satisfied when the number or ratio of the evaluated data whose the analysis result is inaccurate among the analysis result of the learned recognition model for the evaluated data exceeds a preset threshold.

The communication unit 27 may transmit the AI processing result by the AI processor 21 to the external electronic equipment. For example, the external electronic device may include Bluetooth equipment, an autonomous vehicle, a robot, a drone, an AR device, a mobile device, a home appliance, etc.

Although the AI device 20 illustrated in FIG. 6 is functionally divided into the AI processor 21, the memory 25, the communication unit 27 and the like, it is to be noted that the above-described components may be integrated into one module, which is referred to as an AI module.

Figure 7A:
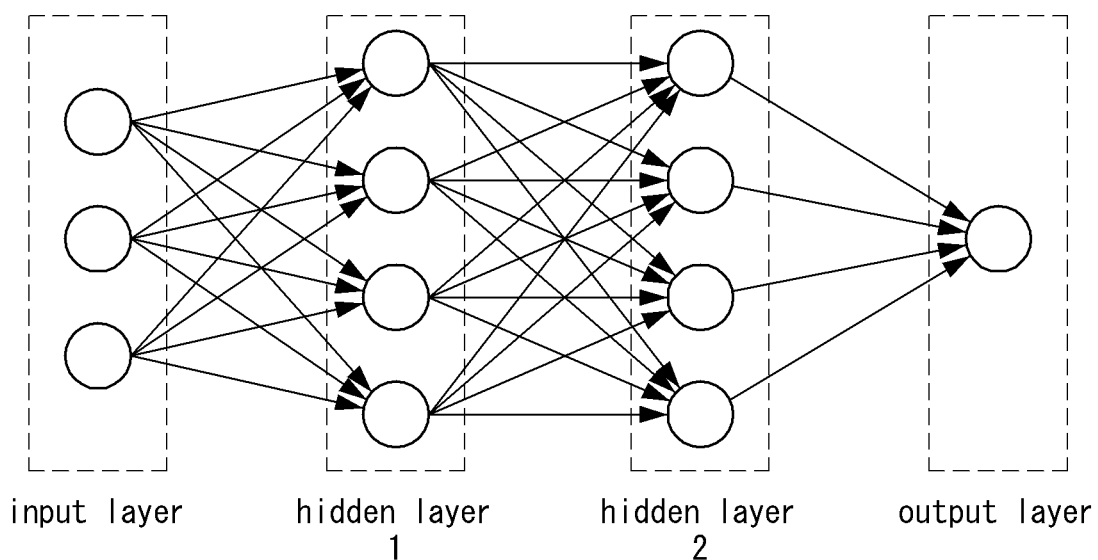
FIGS. 7A and 7B are diagrams illustrating an artificial neural network according to an embodiment of the present disclosure.
Figure 7B:
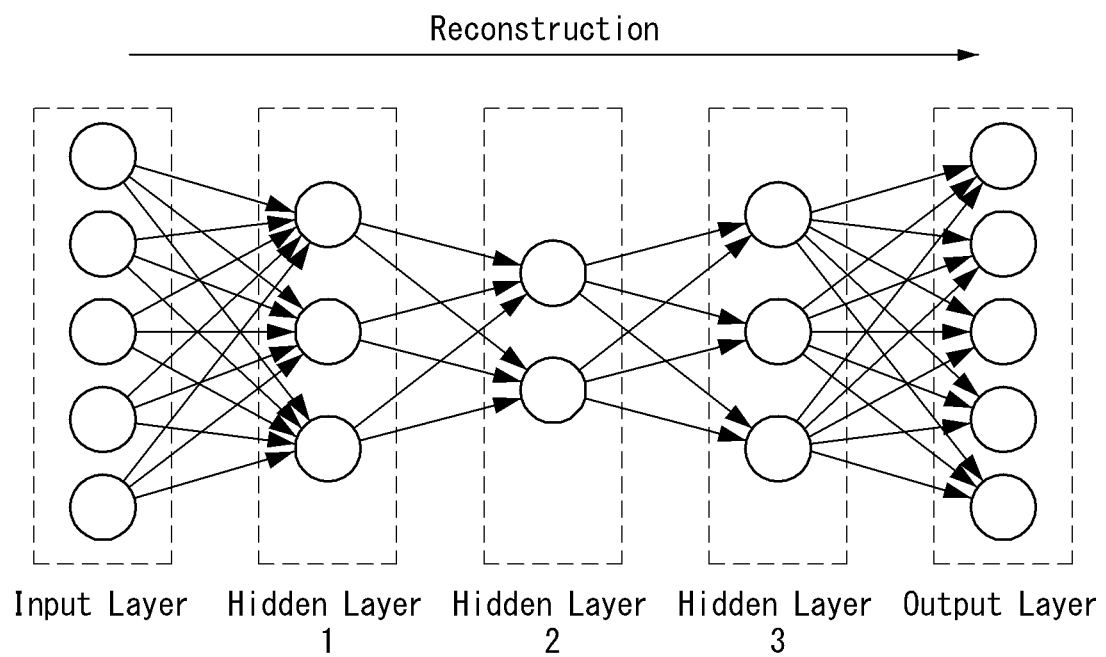

FIGS. 7A and 7B are diagrams illustrating an artificial neural network according to an embodiment of the present disclosure.

To be more specific, FIG. 7A is a diagram illustrating the general structure of the artificial neural network, and FIG. 7B is a diagram illustrating an autoencoder in the artificial neural network that is subjected to encoding, decoding and reconstruction steps.

The artificial neural network is generally composed of an input layer, a hidden layer, and an output layer, and neurons included in the respective layers may be connected via the weight. The artificial neural network may have a form that may approximate a complex function through a linear combination of a weight and a neuron value and a nonlinear activation function. The object of the artificial-neural-network learning is to find a weight for minimizing a difference between a calculated output value and an actual output value in the output layer.

The deep neural network may mean the artificial neural network composed of several hidden layers between the input layer and the output layer. Complex nonlinear relationships may be modeled by using many hidden layers, and thus a neural network structure that enables enhanced abstraction by increasing the number of the layers is called deep learning. The deep learning may be performed by learning a massive volume of data and then selecting an answer having the highest probability, based on the learning result, when new data is input. Therefore, the deep learning may be adaptively operated according to the input data, and may automatically find characteristic factors in the process of learning the model based on the data.

The deep-learning-based model may include various deep learning techniques, such as the deep neural network (DNN) shown in FIG. 6, the convolution neural network (CNN), the recurrent neural network (RNN, Recurrent Boltzmann Machine), the restricted Boltzmann machine (RBM), the deep belief network (DBN) or the deep Q-Network, but is not limited thereto. Furthermore, machine learning methods other than the deep learning may be included. For instance, the characteristic of input data may be extracted by applying the deep-learning-based model, and the machine-learning-based model may be applied when classifying or recognizing the input data based on the extracted characteristic. The machine-learning-based model may include a Support Vector Machine (SVM), AdaBoost, and others, but is not limited thereto.

Referring to FIG. 7A, the artificial neural network according to the embodiment of the present disclosure may include the input layer, the hidden layer, the output layer, and the weight. For example, FIG. 1 shows the structure of the artificial neural network where the size of the input layer is 3, the size of the first and second hidden layers is 4, and the size of the output layer is 1. To be more specific, neurons included in the hidden layer may be connected to neurons included in the input layer via a linear combination with an individual weight included in the weight. Neurons included in the output layer may be connected to neurons included in the hidden layer via a linear combination with an individual weight included in the weight. Furthermore, the artificial neural network may minimize a difference between the calculated output value and the actual output value in the output layer.

Furthermore, the artificial neural network according to the embodiment of the present disclosure may have the structure of the artificial neural network where the size of the input layer is 10, the size of the output layer is 4, and the size of the hidden layer is not limited. Here, data determined as the learning data based on the data related to the operation of the washing machine WM may be input as the input data into the input layer. For example, data on rRPM (request RPM), cRPM (current RPM), Iq (q-axis current, driving current), UB (eccentric value), 3-axis gyro and 3-axis acceleration, which are related to the operation of the washing machine WM, may be input into the input layer.

Referring to FIG. 7B, the artificial neural network according to the embodiment of the present disclosure may include an autoencoder. The autoencoder is an artificial neural network which inputs original data into the artificial neural network to encode the data, and decodes the encoded data to reconstruct the data, and then uses a difference that may occur between the reconstruction data and the input data. For example, the autoencoder may be configured such that the size of the input layer and the size of the output layer may have the same value of 5, the size of the first hidden layer may be 3, the size of the second hidden layer may be 2, the size of the third hidden layer may be 3, the number of nodes of the hidden layer may be gradually reduced towards an intermediate layer and may be gradually increased towards the output layer. The autoencoder shown in FIG. 7B is illustrative, and the embodiment of the present disclosure is not limited thereto. The autoencoder may compare an input value of the original data with an output value of the reconstruction data, and then may determine that the corresponding data is not learned if the difference between the input value and the output value is large, and the corresponding data is previously learned if the difference between the input value and the output value is small. Therefore, the usage of the autoencoder can increase data reliability.

Here, a Mean Square Error (MSE) can be used as a method of comparing the input value with the output value. As the value of the mean square error increases, it may be determined that the data is more likely not to be learned. As the value of the mean square error reduces, it may be determined that the data is more likely to be previously learned.

FIGS. 8A and 8B and FIGS. 9A and 9B are diagrams illustrating an example of a driving profile of the washing machine.

Figure 8A:
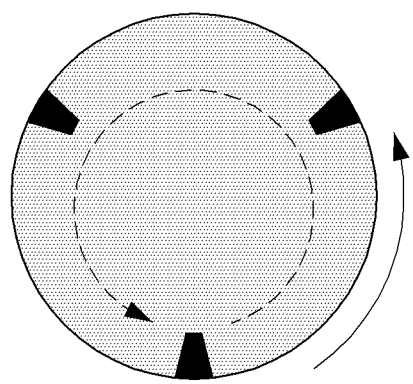
FIGS. 8A and 8B and FIGS. 9A and 9B are diagrams illustrating an example of a driving profile of the washing machine.

FIG. 8A illustrates the driving profile of the laundry when the inner drum 211 of the washing machine WM and the laundry contained therein are not moved. For example, bulky laundry such as a blanket may fill the inner drum 211 of the washing machine WM, so that little or no movement of the laundry can be observed.

Figure 8B:
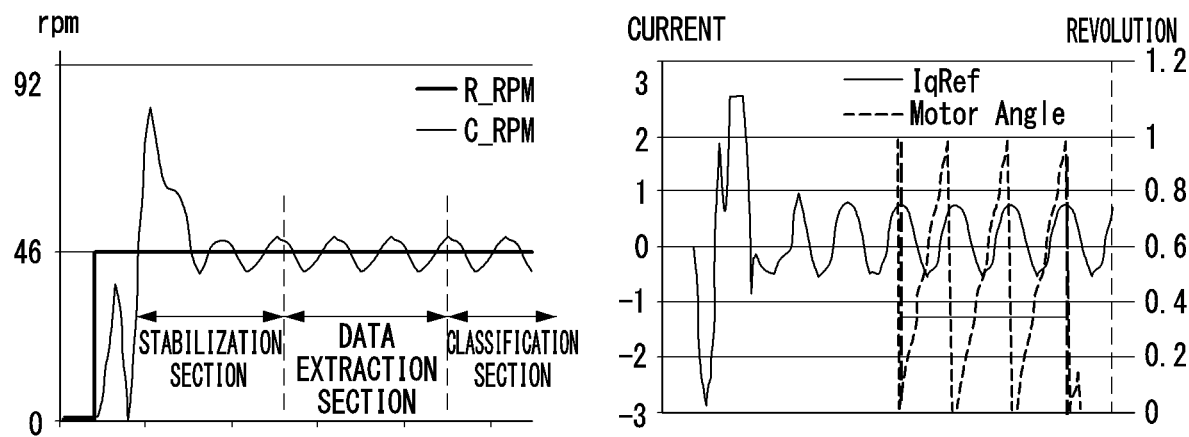

In the case of the laundry filling the inner drum 211, data related to the identification of the laundry movement may be analyzed to obtain a result value different from that of general laundry. In this regard, the data related to the identification of the laundry movement may include the driving current and RPM of the motor provided in the washing machine WM. Referring to FIG. 8B, the x-axis of a graph represents time, while the y-axis represents the data related to the identification of the laundry movement of the washing machine WM.

According to the embodiment of the present disclosure, at a step of identifying the laundry movement, a section for analyzing data may be divided into a stabilization section, a data extraction section, and a classification section. Here, the stabilization section refers to a section that is required until a y-axis value shows a certain periodic characteristic while the washing machine WM is being operated, the data extraction section refers to a section that shows a certain periodic characteristic and extracts data classified as the input data in the deep learning model, and the classification section refers to a section that identifies whether the laundry moves or not through the deep learning model.

Figure 9A:
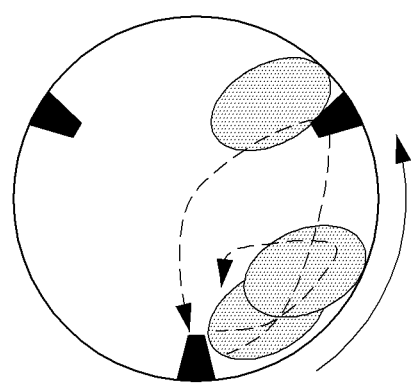
Figure 9B:
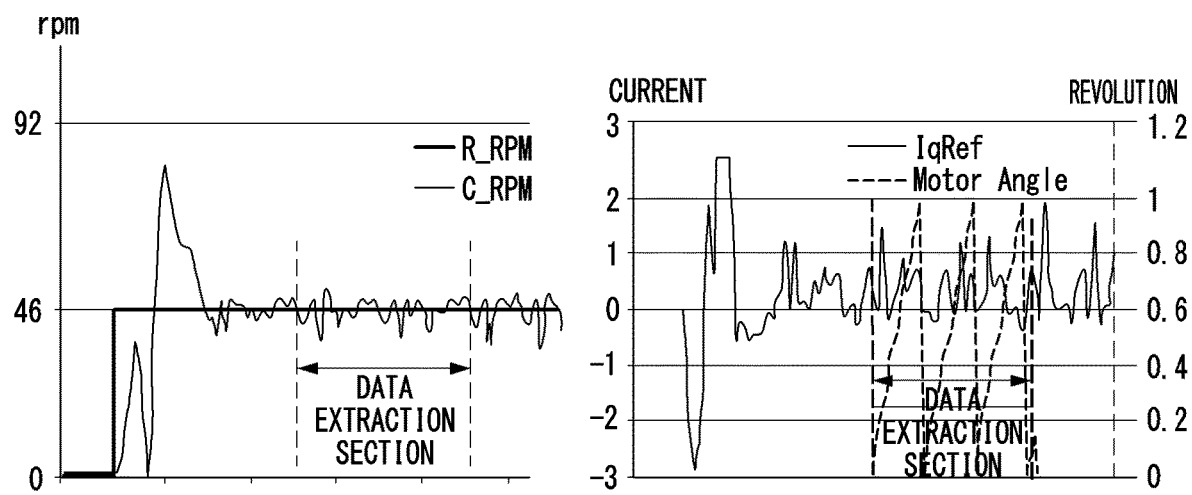

FIG. 9A illustrates the driving profile of the inner drum 211 of the washing machine WM and the general laundry contained therein. As such, in the case of the normally operating washing machine WM, it is possible to observe the laundry that is moved upwards or downwards by the rotation of the inner drum 211 in the rotating inner drum 211. Referring to FIG. 9B, periodicity is not shown in the data analysis graph related to the identification of the laundry movement in the case of general laundry. As the general laundry is moved upwards or downwards, the laundry is moved and RPM is changed by dropping impacts. Furthermore, a current control value is changed by the change of the RPM, and an unpredictable driving current pattern appears. Therefore, it can be determined whether the data related to the identification of the laundry movement including the RPM and the driving current shows the periodicity in the data analysis graph, thus determining whether the laundry moves or not.

Figure 10:
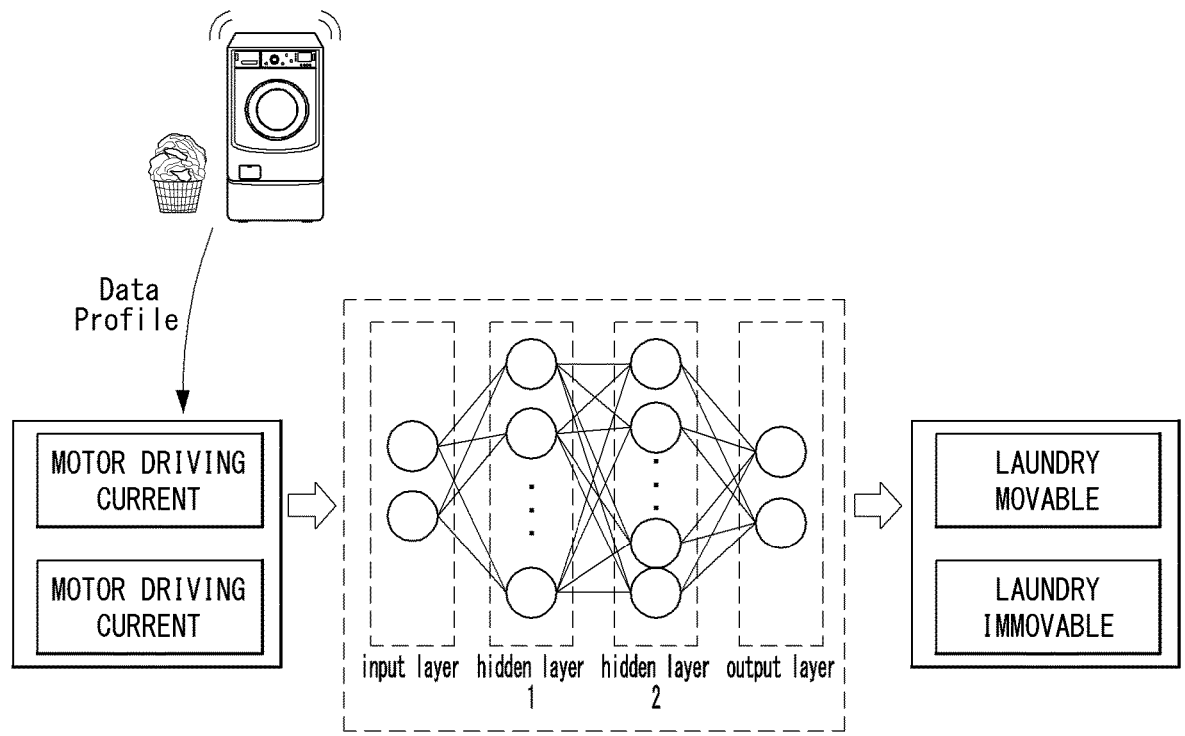
FIG. 10 is a diagram illustrating an example of a method for predicting an unbalancing defect using a deep learning model according to an embodiment of the present disclosure.

FIG. 10 is a diagram illustrating an example of a method for predicting an unbalancing defect using the deep learning model according to an embodiment of the present disclosure.

To be more specific, FIG. 10 shows a method of learning the artificial neural network model for identifying the laundry movement, and a method of identifying the laundry movement using a learned laundry movement identifying model.

The washing machine WM may acquire control information related to the identification of the laundry movement while the inner drum 211 is being rotated. The RPM and the driving current acquired in this way may be acquired as a data profile as the function of time (see FIGS. 8B and 9B).

In the data extraction section of the data profile, the washing machine WM may sample the input data for the deep learning. The sampled data is applied to the input layer of the artificial neural network model, and the output values for the laundry movable state and the laundry immovable state are applied to the output layer of the neural network model. The AI device 20 may generate the laundry movement identifying model by repeating the learning, and then may store this model in the memory of the AI device 20. Here, the learned laundry movement identifying model may be stored in a server by transmitting the corresponding deep learning model to the server other than the memory of the AI device 20 provided in the washing machine.

The artificial neural network model may include at least one hidden layer, and the present disclosure is not limited to the structure of the artificial neural network.

The learned laundry movement identifying model may be used to determine whether the laundry of the laundry is moved or not. To be more specific, while the washing machine WM is being operated, data related to the identification of the laundry movement of the washing machine WM may be applied to the input layer. Here, the data related to the identification of the laundry movement of the washing machine WM may include the driving current, the RPM and others. The washing machine WM may determine whether the laundry of the washing machine WM moves or not, based on the output value of the laundry movement identifying model.

Figure 11:
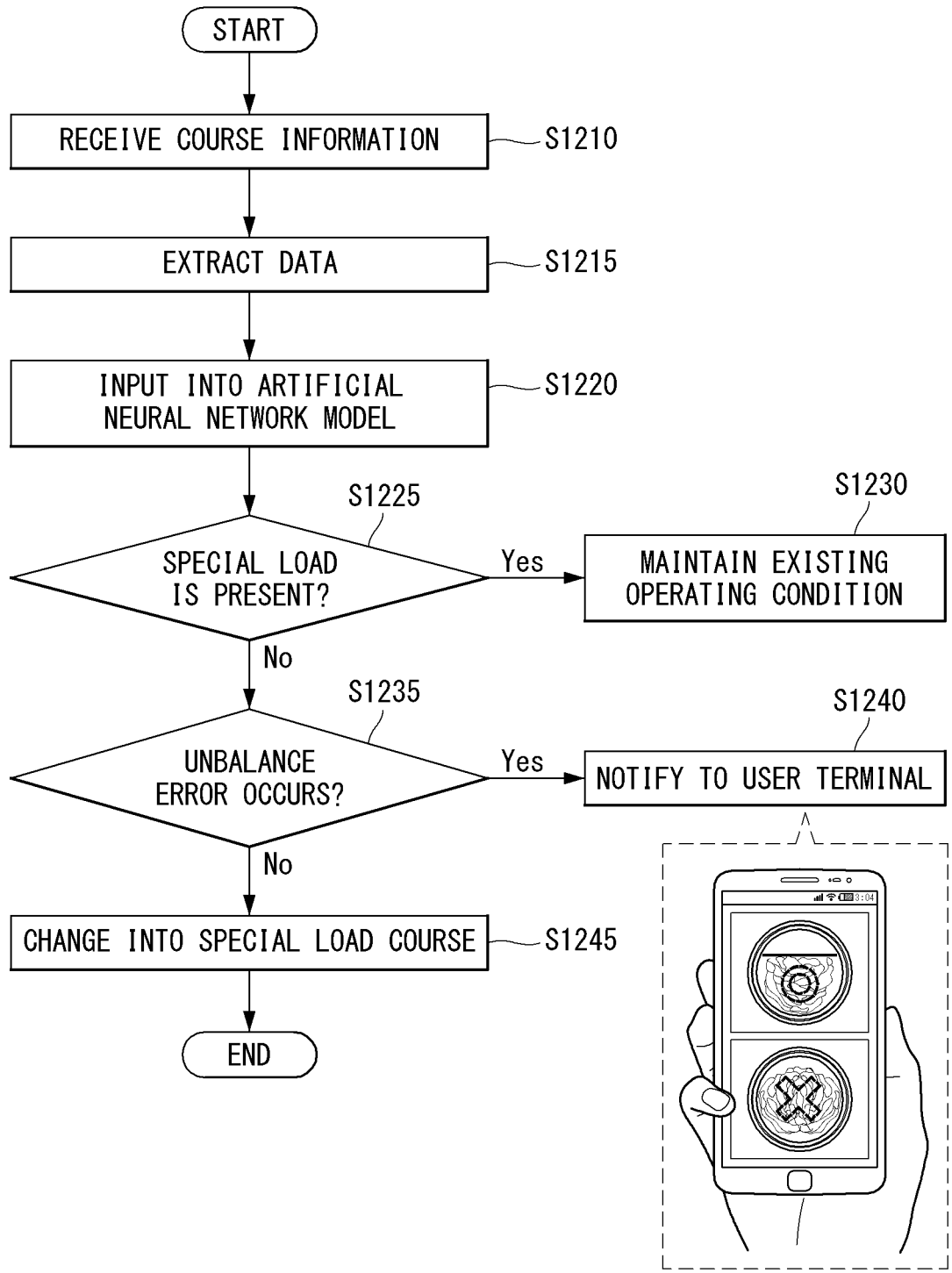
FIG. 11 is a flowchart illustrating unbalancing defect prediction according to an embodiment of the present disclosure.
Figure 12:
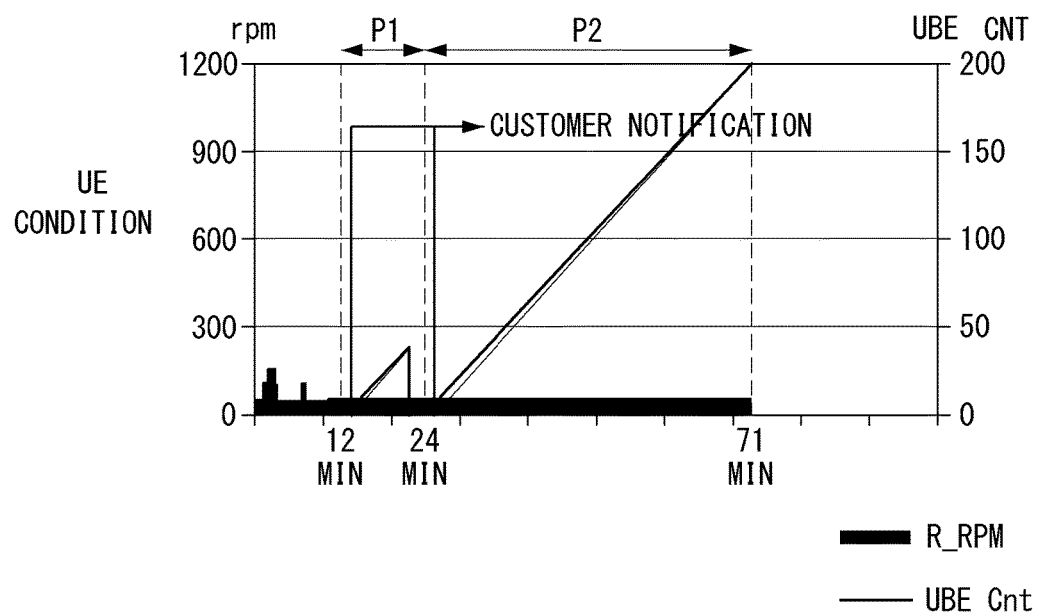
FIG. 12 is a diagram illustrating an example of detecting an unbalancing defect and guiding it to a user terminal according to an embodiment of the present disclosure.

FIG. 11 is a flowchart illustrating unbalancing defect prediction according to an embodiment of the present disclosure, and FIG. 12 is a diagram illustrating an example of detecting an unbalancing defect and guiding it to a user terminal according to an embodiment of the present disclosure.

Referring to FIG. 11, first, the washing machine WM may receive information about the operating course of the washing machine WM through a user interface, at step S1210. The course of the washing machine WM may include a cotton washing mode and a normal mode. In the embodiment of the present disclosure, the course of the washing machine WM may include a special course. In the spin-drying process of the washing machine WM, the special course refers to a course in which the spin-drying is continuously performed except for the laundry dispersion process, unlike the general spin-drying process for laundry.

The washing machine WM may extract data that is to be input into the laundry movement identifying model, and may input the data into the laundry movement identifying model, at steps S1215 and S1220. Here, the input data may be extracted in an operation including a section where the inner drum 211 rotates at the same speed for a predetermined time. For example, the data may be extracted in a tumbling process, a laundry dispersion process, a 108 process, etc.

The laundry dispersion process may include AB operation, which distributes the laundry. When the AB process, the velocity of the inner drum 211 repeats decelerating after maintaining a constant velocity to disperse the laundry. When the 108 process, the inner drum is rotated in the 108 RPM or more for the laundry stuck to the inner drum 211.

The washing machine WM may determine whether the laundry is moved or not according to the output value of the laundry movement identifying model, at step S1225.

If the laundry movement is not present or is less than a preset reference value, the occurrence of the unbalance error is determined. If it is determined that the normal laundry movement is present, the existing operating condition can be continued at steps S1230 and 1235. In the case of maintaining the existing operating condition, the occurrence of the unbalance error is not detected, and the processing of the control unit of the washing machine WM can be simplified.

If the laundry movement is not present or is less than a preset reference value, the presence of the unbalance error can be determined. For example, one bulky laundry may fill the inner drum 211 of the washing machine WM, and a plurality of different laundries may fill the inner drum 211 of the washing machine WM. When the laundry is supplied so that laundry is not moved smoothly, the unbalance error may occur depending on the material or kind of the laundry.

For example, when two kinds of blankets are washed, an A blanket is a winter blanket having high compressibility, and a different B blanket is a summer blanket having low compressibility, pressure relatively higher than average pressure of the inner drum 211 of the washing machine may be applied to one side of the inner drum 211 due to the A blanket having high compressibility. At this time, it may be determined that the unbalance error occurs continuously in the washing drum, and an unbalance error count (UBE CNT) may be gradually increased (see FIG. 12). If the unbalance error occurs, the washing machine WM may stop driving the motor 220, and then washing, rinsing or spin-drying processes may be retried.

If the washing machine WM occurs the unbalance error above a preset threshold value, a message about the unbalance error may be transmitted to the user terminal at step S1240. Here, the user terminal may include the Bluetooth equipment, the autonomous vehicle, the robot, the drone, the AR device, the mobile device, the home appliance, etc.

If it is determined that the unbalance error occurs, the washing machine WM may be changed to the special course, at step S1245. Even if the unbalance error exceeding the preset threshold value is sensed, the special course may repeat an operation process where the unbalance error is sensed, or may proceed to a next operation without returning to a previous process. Particularly, in the embodiment of the present disclosure, even if the unbalance error is sensed, the special course may rapidly finish spin-drying the laundry by gradually increasing the RPM. By using the special course, it has an advantage that a washing time and a consumed current can be reduced.

FIG. 12 shows a method wherein a gradual increase in unbalance error is observed and thereby the unbalance error is detected due to the unsmooth laundry movement. To be more specific, the unbalance error count is gradually increased in a first period. As described in FIG. 11, the reason why the unbalance error count is gradually increased is because the pressure of the laundry is continuously applied to a surface of the inner drum 211 of the washing machine WM.

In various embodiments of the present disclosure, the threshold value of the preset unbalance error count for each operating process of the washing machine WM is set. If the unbalance error count exceeds the threshold value, the washing machine WM may skip to a next process and may terminate the operation of the washing machine WM. To be more specific, in an embodiment of the present disclosure, when the unbalance error exceeding the preset threshold value in a rinsing process period of the washing machine WM is sensed, the rinsing process may be stopped and the spin-drying process may be performed. Furthermore, in an embodiment of the present disclosure, when the unbalance error exceeding the preset threshold value in a spin-drying process period of the washing machine WM is sensed, the driving of the washing machine WM may be terminated.

In an example of FIG. 12, a first period P1 represents the rinsing process period, and a second period P2 represents the spin-drying process period. For example, in the first period P1, the unbalance error of the laundry continues to increase from about 12 minutes. When the error count reaches 40 times, the rinsing process is completed and then the washing machine skips a next process. At this time, the washing machine WM transmits the skip of the corresponding rinsing process through the continuous increase of the unbalance error to the user terminal. Subsequently, in the second period P2, the unbalance error of the washing machine WM continues to increase from about 24 minutes. The washing machine WM terminates all operations at about 71 minutes, and transmits the termination of the washing machine WM due to the generation of the unbalance error to the user terminal.

Figure 13:
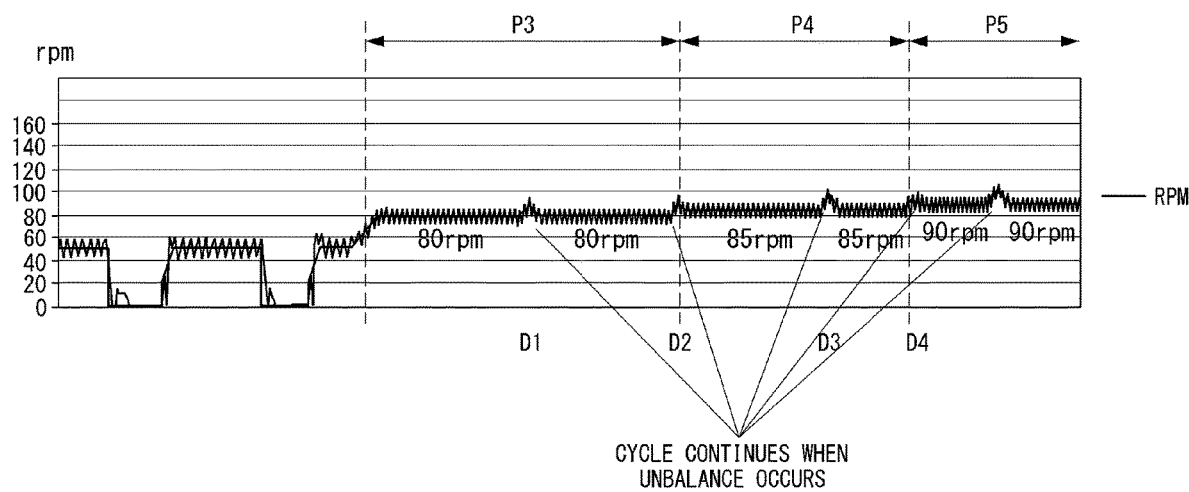
FIGS. 13 and 14 illustrate an operation profile of a special course when an unbalance error is detected or predicted according to an embodiment of the present disclosure.
Figure 14:
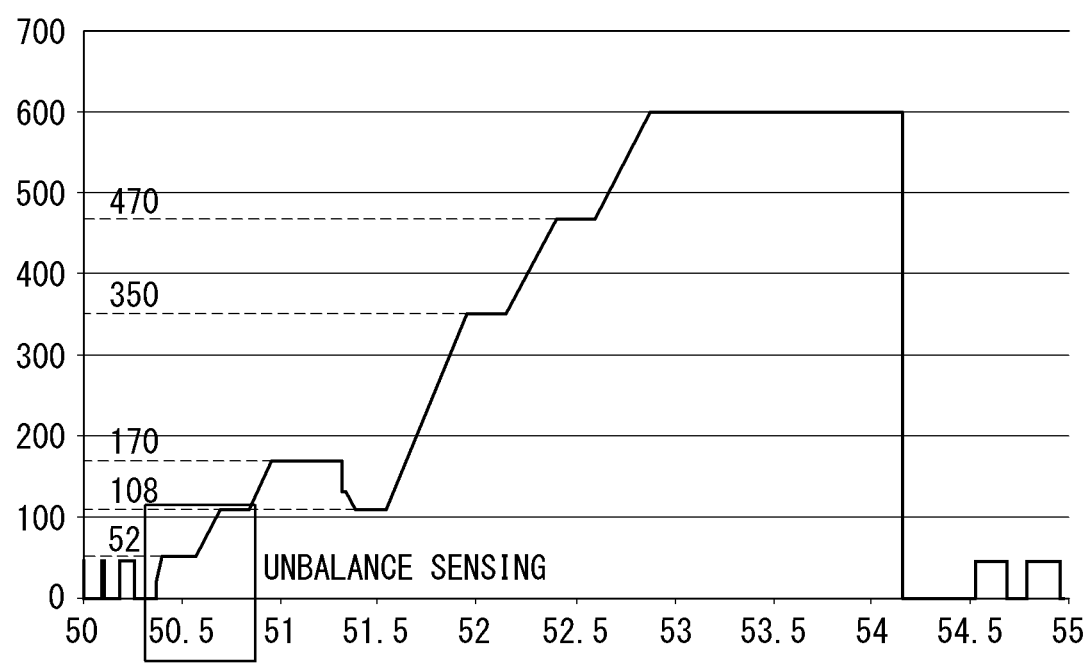

FIGS. 13 and 14 illustrate the operation profile of the special course when the unbalance error is detected or predicted according to an embodiment of the present disclosure.

In an embodiment of the present disclosure, when it is determined that there is no laundry movement in the contained laundry and the unbalance error occurs, the washing machine WM may change and perform the spin-drying process. To be more specific, since it is unnecessary to perform the laundry dispersion process when the unbalance error is predicted, the short-circuit does not occur due to the unbalance detection in the laundry dispersion process, and the RPM may be maintained before the short-circuit. Furthermore, according to an embodiment of the present disclosure, it is possible to maintain the RPM before the short-circuit and to control the RPM of the motor 220 in response to a change in unbalance value.

Referring to FIG. 13, while the spin-drying process is performed at 80 RPM in a third period P3, the short-circuit occurs in a first point D1. Even if the short-circuit occurs in the first point D1, the motor 220 does not stop operating and the spin-drying process is continued at 80 RPM. Furthermore, when it is determined that the unbalance value is saturated based on a variation of the unbalance value, or there is little change in unbalance value for 5 minutes or more, it is possible to perform a next spin-drying process. For example, when the spin-drying operation is started and it is determined that the unbalance value is saturated in an AB operation, the washing machine WM may enter a MS operation. Simultaneously, the RPM of the motor 220 rises from 80 RPM that is a first value to 90 RPM. During the AB operation period, the velocity of the inner drum 211 repeats decelerating after maintaining a constant velocity to disperse the laundry. MS operation is simple dehydrating operation. During MS operation period the motor 220 accelerates the rotational velocity of inner drum 211 to specific RPM. For example, the RPM of the inner drum may be increased from 70 RPM to 100 RPM during the MS operation period.

Referring to FIG. 14, when the unbalance is sensed in an initial spin-drying process, the RPM information profile of the washing machine WM is as follows: the operation of the motor 220 is not ceased, and it is determined whether the unbalance value is satisfied or not for a predetermined time, and then the RPM of the motor 220 rises to perform the next spin-drying operation.

Figure 15:
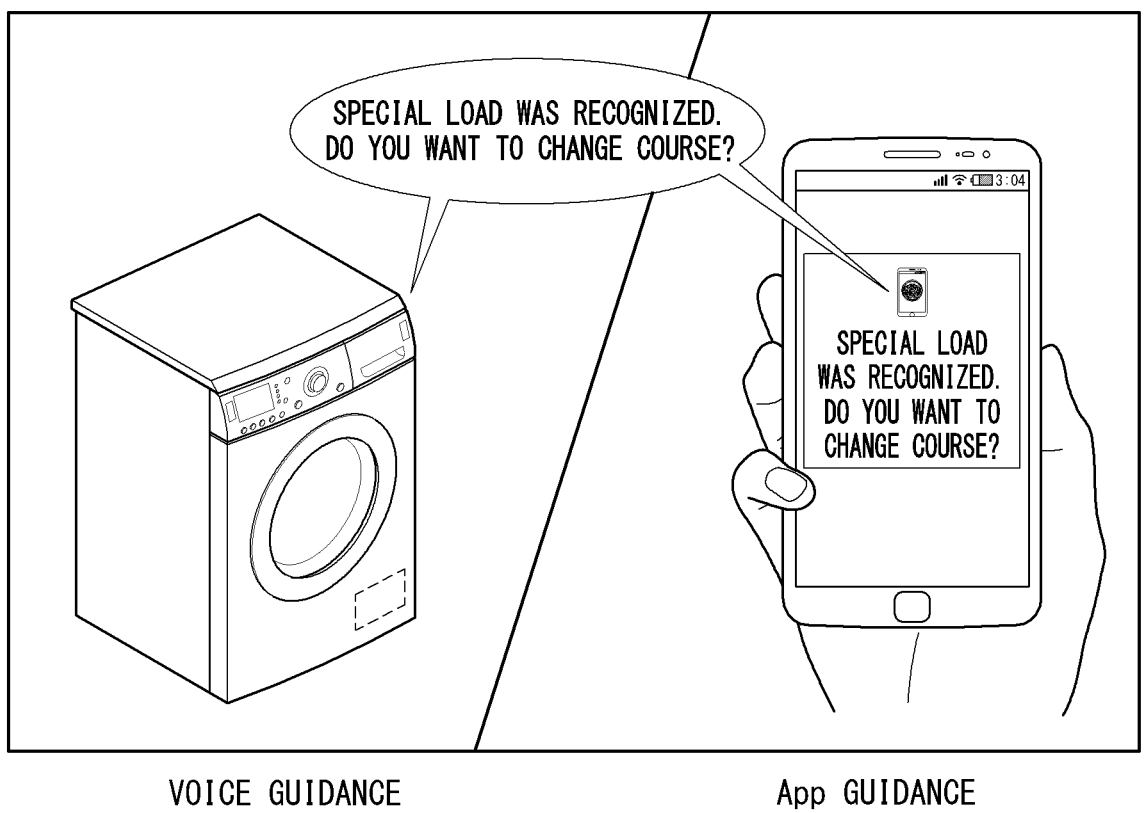
FIG. 15 illustrates an example of transmitting an unbalance error generation message to a user's mobile device and displaying the message through the mobile device according to an embodiment of the present disclosure.

FIG. 15 illustrates an example of transmitting an unbalance error generation message to a user's mobile device and displaying the message through the mobile device according to an embodiment of the present disclosure.

Referring to FIG. 15, when the unbalance error is sensed in the washing, rinsing or spin-drying process, the washing machine WM may transmit a message including information about the sensed unbalance error to the user terminal including the user's mobile device. Here, the information about the unbalance error may include an image photographing the condition of the laundry in the inner drum 211 of the washing machine, the fact that the unbalance error occurs, time when the unbalance error occurs, at least one menu receiving a user's response to the unbalance error.

In various embodiments of the present disclosure, when the laundry movement of the laundry is not sensed through the communication module, the washing machine WM may transmit the message related to the change of the course of the washing machine WM to the user terminal. The user may transmit the message for changing the operating course of the washing machine WM in response to the corresponding message to the washing machine WM. According to a user's response, the washing machine WM may change its course into the special course to perform the washing, rinsing or spin-drying process. The user terminal may receive the user's selection in the manner of recognizing the user's utterance voice or inputting the user's touch signal that is input into a touch screen, and then transmit the response to the washing machine WM. Here, the user terminal may include a mobile device, a vehicle, an AI speaker, etc.

In an embodiment of the present disclosure, the washing machine WM may transmit the message about the unbalance error of the laundry through the communication module to the user terminal. When the unbalance error occurs, as in the above-described embodiments of the present disclosure, the washing operation may be changed into the special course and then continued, information about the unbalance error may be transmitted to the user terminal, and the washing machine WM may terminate its operation according to the user's response.

Furthermore, in an embodiment of the present disclosure, the washing machine WM may deliver the message about the unbalance error through the speaker in the form of a sound, and may display the message about the unbalance error through the display unit.

Figure 16:
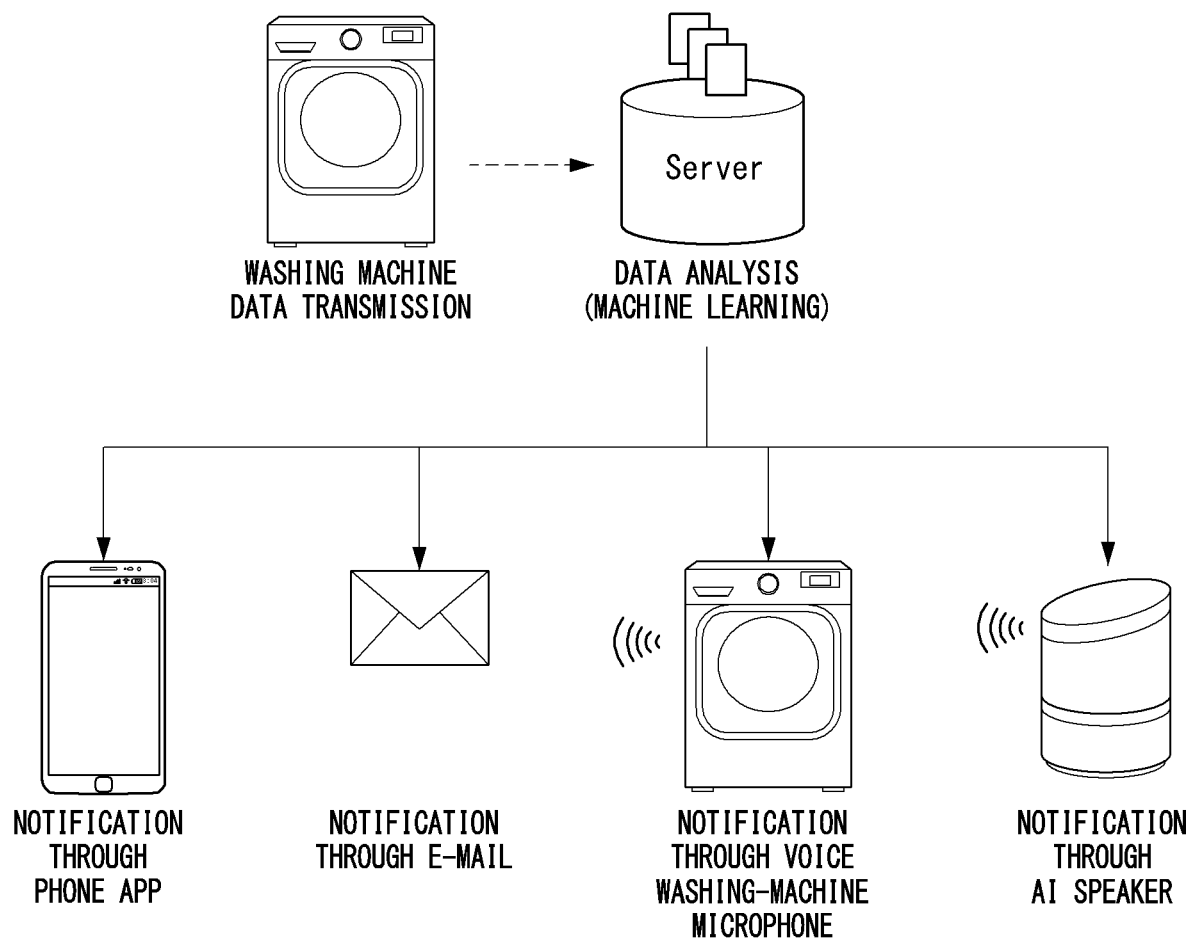
FIG. 16 illustrates a method for transmitting a guide message to a user terminal when the unbalance error occurs, according to an embodiment of the present disclosure.

FIG. 16 illustrates a method for transmitting a guide message to the user terminal when the unbalance error occurs, according to an embodiment of the present disclosure.

Referring to FIG. 16, in the embodiment of the present disclosure, the AI device 20 may be provided in the washing machine WM, and may be provided on the external server. The external server may receive information about the driving current or the RPM of the motor received from the washing machine WM. The AI device 20 of the server may learn the laundry movement identifying model based on information about the driving current or the RPM of the motor 220 of the washing machine WM, and may determine whether the laundry moves or not using the laundry movement identifying model. When the laundry movement is not sensed, the server may transmit a message showing that there is no movement of the laundry to the user terminal including the washing machine WM.

In this regard, the server may receive the learning data of the laundry movement identifying model from at least one washing machine WM, and may repeatedly learn the laundry movement identifying model to be used for the detection of the unbalance error and the corresponding method.

The above-described present disclosure may be embodied as a computer readable code on a medium on which a program is recorded. The computer readable medium includes all kinds of recording devices in which data that can be read by the computer system is stored. Examples of the computer readable medium include Hard Disk Drives (HDD), Solid State Disks (SSD), Silicon Disk Drives (SDD), ROMs, RAM,s CD-ROMs, magnetic tapes, floppy disks, optical data storing devices and others. Furthermore, the computer readable medium may be embodied in the form of a carrier wave (e.g. transmission via the Internet). Therefore, the above embodiments are to be construed in all aspects as illustrative and not restrictive. The scope of the disclosure should be determined by the appended claims, and all changes coming within the meaning and equivalency range of the appended claims are intended to be embraced therein.

Effects of a machine-learning-based smart washing machine according to an embodiment of the present disclosure will be described as follows.

The present disclosure has an advantage in that it is possible to identify whether a laundry is moved or not.

The present disclosure also has an advantage in that a customer can recognize the occurrence of an unbalance error (UBE) through a terminal, if the occurrence of the unbalance error is predicted.

Furthermore, the present disclosure has an advantage in that a spin-drying profile may be changed to reduce a running time, if the occurrence of the unbalance error is predicted.

The effects of the present disclosure are not limited to the effects described above and other effects can be clearly understood by those skilled in the art from the following description.

What is claimed is:

1. A method of detecting an unbalance error of a machine-learning-based washing machine, the method comprising:
acquiring, by a controller, data of a driving current and revolutions per minute (RPM) of a motor of the washing machine while the washing machine is being operated;
extracting input data from the acquired data;
inputting the extracted input data into a laundry movement identifying model;
determining whether laundry in an inner drum of the washing machine is moving within the inner drum based on an output value of the laundry movement identifying model; and
when it is determined that the laundry is not moving within the inner drum based on the output value of the laundry movement identifying model, detecting the unbalance error based on the data of the driving current and the RPM of the motor.

2. The method of claim 1, wherein an operating course of the washing machine being operated comprises at least one of a washing course, a rinsing course or a spin-drying course, and
wherein the acquiring data of the driving current and the RPM of the motor is performed during one of the washing course or the spin-drying course when the laundry comes into contact with the inner drum while maintaining a preset speed.

3. The method of claim 1, wherein the extracting of the input data includes:
analyzing a profile of the acquired data; and
sampling the input data during a stabilization section in the profile of the acquired data, the stabilization section having a predetermined periodicity.

4. The method of claim 1, wherein the detecting of the unbalance error comprises:
measuring an unbalance value based on the acquired data of the driving current and the RPM of the motor; and
determining that the unbalance error occurs when the unbalance value exceeds a preset threshold value.

5. The method of claim 4, further comprising changing an operating course of the washing machine when the washing machine is being operated into a special course of the washing machine when the unbalance value is less than the preset threshold value,
wherein the special course does not perform a laundry dispersion process.

6. The method of claim 4, further comprising transmitting a message regarding the unbalance error to a terminal of a user when the unbalance error is detected.

7. The method of claim 6, further comprising:
receiving a response from the terminal of the user to the message regarding the unbalance error, and
controlling an operation of the washing machine based on the response.

8. The method of claim 7, wherein the controlling of the operation of the washing machine includes terminating an operating course of the washing machine being operated or changing the operating course to a special course, and
wherein the special course does not perform a laundry dispersion process.

9. The method of claim 6, wherein the message regarding the unbalance error comprises at least one of an image of a condition of the laundry in the inner drum, information indicating the unbalance error or information indicating a time when the unbalance error occurred.

10. The method of claim 4, further comprising delivering a guide message through a speaker of the washing machine when the unbalance error occurs.

* * * * *